US011165765B2

(12) United States Patent
Baker et al.

(10) Patent No.: US 11,165,765 B2
(45) Date of Patent: Nov. 2, 2021

(54) POLICY NOTIFICATION SYSTEM AND METHOD FOR ELECTRONIC VAPOR PROVISION SYSTEMS

(71) Applicant: NICOVENTURES HOLDINGS LIMITED, London (GB)

(72) Inventors: Darryl Baker, London (GB); Ross Oldbury, London (GB)

(73) Assignee: Nicoventures Trading Limited, London (GB)

( * ) Notice: Subject to any disclaimer, the term of this patent is extended or adjusted under 35 U.S.C. 154(b) by 871 days.

(21) Appl. No.: 15/764,221

(22) PCT Filed: Sep. 14, 2016

(86) PCT No.: PCT/GB2016/052830
§ 371 (c)(1),
(2) Date: Mar. 28, 2018

(87) PCT Pub. No.: WO2017/055801
PCT Pub. Date: Apr. 6, 2017

(65) Prior Publication Data
US 2018/0286207 A1    Oct. 4, 2018

(30) Foreign Application Priority Data

Sep. 28, 2015    (GB) ..................... 1517091

(51) Int. Cl.
*A24F 40/65*    (2020.01)
*H04L 29/06*    (2006.01)
(Continued)

(52) U.S. Cl.
CPC .......... *H04L 63/0823* (2013.01); *A24F 40/65* (2020.01); *G05B 15/02* (2013.01);
(Continued)

(58) Field of Classification Search
CPC .............................. H04L 9/321; H04L 9/3213
See application file for complete search history.

(56) References Cited

U.S. PATENT DOCUMENTS 8,555,344 B1    10/2013 Ulrich
10,334,885 B2    7/2019 Baker
(Continued)

FOREIGN PATENT DOCUMENTS

CN    103653261    3/2014
CN    103798960 A    5/2014
(Continued)

OTHER PUBLICATIONS

Dialog, *DA14580 Low Power Bluetooth Smart SoC*. As available at: http://www.dialog-semiconductor.com/products/bluetooth-smart/smartbond-da14580. Jan. 29, 2015, dated Jan. 29, 2015, vol. 3.1, 158 pages.

(Continued)

*Primary Examiner* — Kevin Kim
(74) *Attorney, Agent, or Firm* — Patterson Thuente Pedersen, P.A.

(57) ABSTRACT

A mobile communication device includes a wireless receiver adapted to receive a beacon signal from a wireless beacon, the beacon signal including a unique identifier and a common identifier indicating that the beacon is used for the transmission of vaping policies; a processor adapted to detect within the beacon signal the common identifier; a transmitter adapted to transmit the unique identifier to a remote server; and a receiver adapted to receive from the remote server indicator data indicative of the authenticity of the beacon signal.

15 Claims, 10 Drawing Sheets

(51) Int. Cl.

| | | |
|---|---|---|
| *H04W 4/029* | (2018.01) | |
| *H04W 12/069* | (2021.01) | |
| *G05B 15/02* | (2006.01) | |
| *G08B 21/18* | (2006.01) | |
| *H04W 4/02* | (2018.01) | |
| *H04W 4/021* | (2018.01) | |
| *H04L 29/08* | (2006.01) | |
| *A24F 40/10* | (2020.01) | |

(52) U.S. Cl.
CPC ............ *G08B 21/18* (2013.01); *H04W 4/023* (2013.01); *H04W 4/029* (2018.02); *H04W 12/069* (2021.01); *A24F 40/10* (2020.01); *H04L 67/306* (2013.01); *H04W 4/021* (2013.01)

(56) References Cited

U.S. PATENT DOCUMENTS

| | | | |
|---|---|---|---|
| 10,369,308 B2 | 8/2019 | Baker | |
| 2011/0265806 A1 | 11/2011 | Alarcon | |
| 2012/0230193 A1 | 9/2012 | Yang | |
| 2013/0276799 A1 | 10/2013 | Davidson | |
| 2013/0284192 A1* | 10/2013 | Peleg | H04L 67/42 131/329 |
| 2014/0174459 A1 | 6/2014 | Burstyn | |
| 2014/0254466 A1 | 9/2014 | Wurster | |
| 2015/0100441 A1 | 4/2015 | Alarcon | |
| 2015/0101625 A1 | 4/2015 | Newton | |
| 2015/0114407 A1 | 4/2015 | Elwha | |
| 2015/0181945 A1* | 7/2015 | Tremblay | A24F 40/60 131/328 |
| 2016/0066123 A1* | 3/2016 | Ko | H04B 17/27 455/41.1 |
| 2016/0081393 A1* | 3/2016 | Black | H05B 1/0252 392/387 |
| 2016/0286585 A1* | 9/2016 | Choi | H04W 12/06 |
| 2016/0294844 A1* | 10/2016 | Woo | H04W 4/021 |
| 2016/0331027 A1* | 11/2016 | Cameron | A24F 40/53 |
| 2018/0270311 A1 | 9/2018 | Baker | |
| 2018/0270643 A1 | 9/2018 | Baker | |
| 2018/0286208 A1 | 10/2018 | Baker | |

FOREIGN PATENT DOCUMENTS

| | | |
|---|---|---|
| CN | 103815548 | 5/2014 |
| CN | 203709255 U | 7/2014 |
| CN | 203913385 U | 11/2014 |
| CN | 104664605 | 6/2015 |
| JP | 2000099857 | 4/2000 |
| JP | 2007276672 | 10/2007 |
| JP | 2007310755 | 11/2007 |
| JP | 2008-095382 | 4/2008 |
| JP | 2014528764 | 10/2014 |
| JP | 2014236785 | 12/2014 |
| JP | 2015517312 | 6/2015 |
| WO | WO2002086718 | 10/2002 |
| WO | WO2006013958 | 2/2006 |
| WO | WO2012160560 | 11/2012 |
| WO | WO2014150704 A2 | 9/2014 |
| WO | WO2014195805 A2 | 12/2014 |
| WO | WO2016008096 A1 | 1/2016 |
| WO | WO2016019549 A1 | 2/2016 |

OTHER PUBLICATIONS

IEEE, 802.15.1 (Jun. 14, 2002) *IEEE Standard for Telecommunications and Information Exchange Between Systems—LAN/MAN—Specific Requirements Part 15: Wireless Medium Access Control (MAC) and Physical Layer (PHY) Specifications for Wireless Personal Area Networks (WPANs)*, 2 pages.
IEEE, 802.11ah *IEEE Draft Standard for Information Technology Telecommunications and Information Exchange between Systems—Local and Metropolitan Area networks—Specific Requirements—Part 11: Wireless LAN Medium Access Control (MAC) and Physical Layer* (Feb. 2016), 2 pages.
IEEE, *IEEE Publishes the 802.11v Amendment Titled Wireless Network Management to Extend the Base IEEE 802.11™ Wireless LAN Standards* (May 13, 2011), 1 page.
ISO 13157-1: *2014 Information Technology—Telecommunications and information exchange between systems—NFC Security Part 1 NFC-SEC NFCIP-1 security services and protocol* (Aug. 15, 2014), 2 pages.
Bluetooth, *Bluetooth Smart Technology: Powering the Internet of things*, as available at http://www.bluetooth.com/Pages/Bluetooth-Smart.aspx (Nov. 10, 2014), 2 pages.
Great Britain Search Report, Application No. GB1517091.3, dated Feb. 18, 2016, 5 pages.
International Search Report and Written Opinion, Application No. PCT/GB2016/052830, dated Dec. 2, 2016, 13 pages.
International Preliminary Report on Patentability, Application No. PCT/GB2016/052830, dated Nov. 29, 2017, 16 pages.
Japanese Office Action, Application No. 2018-515455, dated Apr. 10, 2019, 15 pages.
Translation of Japanese Search Report, Application No. 2018-515455, dated Mar. 26, 2019, 22 pages.
Chinese Search Report, Application No. 2016800518855, dated Dec. 4, 2019, 3 pages.
Japanese Decision to Grant, Application No. 2018-515455, dated Dec. 16, 2019, 6 pages.
Korean Grant of Patent (English Translation), Application No. 10-2019-7035656, dated Feb. 26, 2016, 1 page.
Korean Notice of Allowance, Application No. 10-2019-7035656, dated May 26, 2016, 3 pages.

* cited by examiner

POLICY NOTIFICATION SYSTEM AND METHOD FOR ELECTRONIC VAPOR PROVISION SYSTEMS

PRIORITY CLAIM

The present application is a National Phase entry of PCT Application No. PCT/GB2016/052830, filed Sep. 14, 2016, which claims priority from GB Patent Application No. 1517091.3, filed Sep. 28, 2015, each of which is hereby fully incorporated herein by reference.

FIELD

The present disclosure relates to a policy notification system and method for electronic vapor provision systems such as electronic nicotine delivery systems (e.g. e-cigarettes).

BACKGROUND

Electronic vapor provision systems, such as e-cigarettes and other aerosol delivery systems, generally contain a reservoir of liquid which is to be vaporized, typically nicotine (this is sometimes referred to as an "e-liquid"). When a user inhales on the device, an electrical (e.g. resistive) heater is activated to vaporize a small amount of liquid, in effect producing an aerosol which is therefore inhaled by the user. The liquid may comprise nicotine in a solvent, such as ethanol or water, together with glycerine or propylene glycol to aid aerosol formation, and may also include one or more additional flavors. The skilled person will be aware of many different liquid formulations that may be used in e-cigarettes and other such devices.

The practice of inhaling vaporized liquid in this manner is commonly known as "vaping."

An e-cigarette may have an interface to support external data communications. This interface may be used, for example, to load control parameters and/or updated software onto the e-cigarette from an external source. Alternatively or additionally, the interface may be utilized to download data from the e-cigarette to an external system. The downloaded data may, for example, represent usage parameters of the e-cigarette, fault conditions, etc. As the skilled person will be aware, many other forms of data can be exchanged between an e-cigarette and one or more external systems (which may be another e-cigarette).

In some cases, the interface for an e-cigarette to perform communication with an external system is based on a wired connection, such as a USB link using a micro, mini, or ordinary USB connection into the e-cigarette. The interface for an e-cigarette to perform communication with an external system may also be based on a wireless connection. Such a wireless connection has certain advantages over a wired connection. For example, a user does not need any additional cabling to form such a connection. In addition, the user has more flexibility in terms of movement, setting up a connection, and the range of pairing devices.

Note that many e-cigarettes already provide support for a USB interface in order to allow the e-cigarette to be recharged. Accordingly, the additional use of such a wired interface to also provide data communications is relatively straightforward. However, the situation for providing a wireless data connection is more complex.

Other previously proposed arrangements are disclosed in US 2014/254466, U.S. Pat. No. 8,555,344, US 2012/230193, WO 2014/195805, and US 2015/101625.

SUMMARY

In one aspect of the present disclosure, there is provided an electronic vapor provision system.

In another aspect of the present disclosure, there is provided a mobile communication device.

In another aspect of the present disclosure, there is provided a beacon authentication server.

In one aspect of the present disclosure, there is provided a wireless vaping policy beacon.

In another aspect of the present disclosure, there is provided a method of authenticating a wireless vaping policy beacon at a mobile communication device.

In another aspect of the present disclosure, there is provided a method of authenticating a wireless vaping policy beacon at a server.

In another aspect of the present disclosure, there is provided a method of implementing a wireless vaping policy at an electronic vapor provision system.

Further respective aspects and features of the disclosure are defined in the appended claims.

BRIEF DESCRIPTION OF THE DRAWINGS

Embodiments of the present disclosure will now be described by way of example with reference to the accompanying drawings, in which.

DETAILED DESCRIPTION

A policy notification system and method for electronic vapor provision systems are disclosed. In the following description, a number of specific details are presented in order to provide a thorough understanding of certain example implementations of apparatus and methods according to the present disclosure. It will be apparent, however, to a person skilled in the art that these specific details need not be employed in all implementations. Conversely, specific details known to the person skilled in the art are omitted for the purposes of clarity where appropriate.

As described above, the present disclosure relates to an electronic vapor provision system, such as an e-cigarette. Throughout the following description the term "e-cigarette" is used; however, this term may be used interchangeably with electronic vapor provision system, aerosol delivery device, and other similar terminology.

Figure 1:
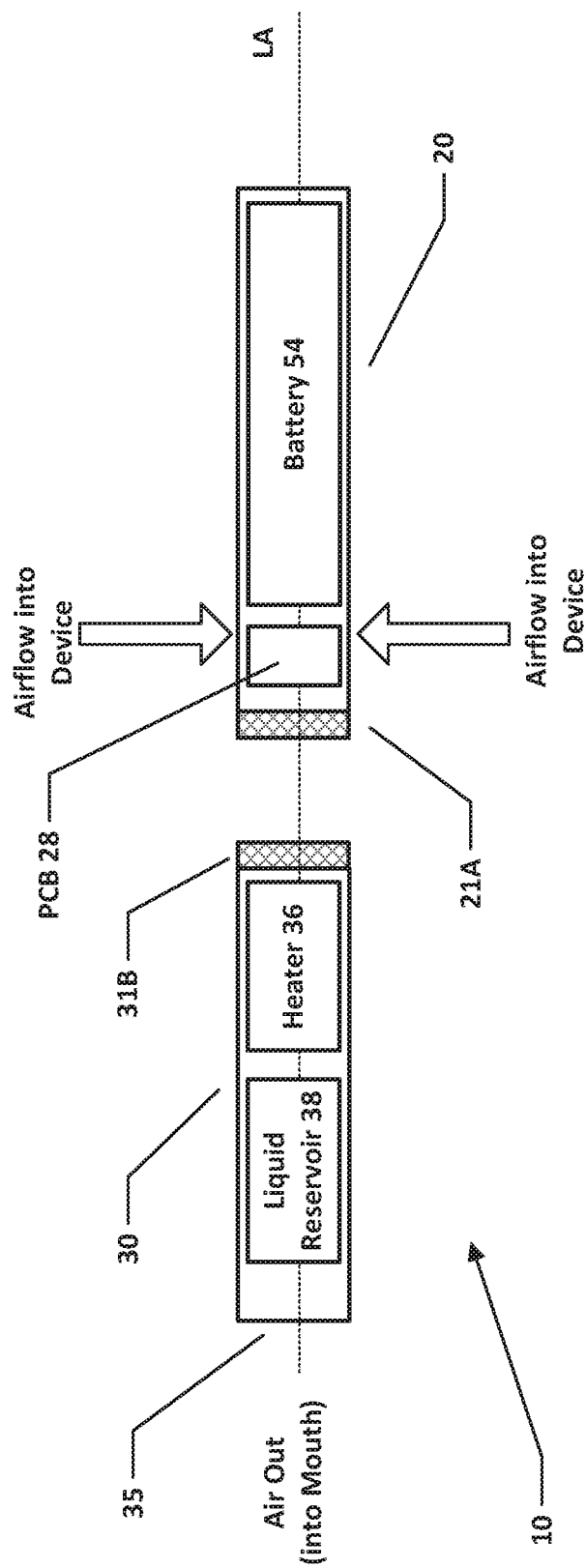
FIG. 1 is a schematic (exploded) diagram of an e-cigarette in accordance with some embodiments of the disclosure.

FIG. 1 is a schematic (exploded) diagram of an e-cigarette 10 in accordance with some embodiments of the disclosure (not to scale). The e-cigarette comprises a body or control unit 20 and a cartomizer 30. The cartomizer 30 includes a reservoir 38 of liquid, typically including nicotine, a heater 36, and a mouthpiece 35. The e-cigarette 10 has a longitudinal or cylindrical axis which extends along the center-line of the e-cigarette 10 from the mouthpiece 35 at one end of the cartomizer 30 to the opposing end of the control unit 20 (usually referred to as the tip end). This longitudinal axis is indicated in FIG. 1 by the dashed line denoted LA.

The liquid reservoir 38 in the cartomizer 30 may hold the (e-)liquid directly in liquid form, or may utilize some absorbing structure, such as a foam matrix or cotton material, etc., as a retainer for the liquid. The liquid is then fed from the reservoir 38 to be delivered to a vaporizer comprising the heater 36. For example, liquid may flow via capillary action from the reservoir 38 to the heater 36 via a wick (not shown in FIG. 1).

In other devices, the liquid may be provided in the form of plant material or some other (ostensibly solid) plant derivative material. In this case the liquid can be considered as representing volatiles in the material which vaporize when the material is heated. Note that devices containing this type of material generally do not require a wick to transport the liquid to the heater, but rather provide a suitable arrangement of the heater in relation to the material to provide suitable heating.

The control unit 20 includes a re-chargeable cell or battery 54 to provide power to the e-cigarette 10 (referred to hereinafter as a battery) and a printed circuit board (PCB) 28 and/or other electronics for generally controlling the e-cigarette 10.

The control unit 20 and the cartomizer 30 are detachable from one another, as shown in FIG. 1, but are joined together when the device 10 is in use, for example, by a screw or bayonet fitting. The connectors on the cartomizer 30 and the control unit 20 are indicated schematically in FIG. 1 as 31B and 21A respectively. This connection between the control unit 20 and cartomizer 30 provides for mechanical and electrical connectivity between the two.

When the control unit 20 is detached from the cartomizer 30, the electrical connection 21A on the control unit 20 that is used to connect to the cartomizer 30 may also serve as a socket for connecting a charging device (not shown). The other end of this charging device can be plugged into a USB socket to re-charge the battery 54 in the control unit 20 of the e-cigarette 10. In other implementations, the e-cigarette 10 may be provided (for example) with a cable for direct connection between the electrical connection 21A and a USB socket.

The control unit 20 is provided with one or more holes for air inlet adjacent to PCB 28. These holes connect to an air passage through the control unit to an air passage provided through the connector 21A. This then links to an air path through the cartomizer 30 to the mouthpiece 35. Note that the heater 36 and the liquid reservoir 38 are configured to provide an air channel between the connector 31B and the mouthpiece 35. This air channel may flow through the centre of the cartomizer 30, with the liquid reservoir 38 confined to an annular region around this central path. Alternatively (or additionally) the airflow channel may lie between the liquid reservoir 38 and an outer housing of the cartomizer 30.

When a user inhales through the mouthpiece 35, air is drawn into the control unit 20 through the one or more air inlet holes. This airflow (or the associated change in pressure) is detected by a sensor, e.g. a pressure sensor, which in turn activates the heater 36 to vaporize the nicotine liquid fed from the reservoir 38. The airflow passes from the control unit 20 into the vaporizer, where the airflow combines with the nicotine vapor. This combination of airflow and nicotine vapor (in effect, an aerosol) then passes through the cartomizer 30 and out of the mouthpiece 35 to be inhaled by a user. The cartomizer 30 may be detached from the control unit 20 and disposed of when the supply of nicotine liquid is exhausted (and then replaced with another cartomizer).

It will be appreciated that the e-cigarette 10 shown in FIG. 1 is presented by way of example only, and many other implementations may be adopted. For example, in some implementations, the cartomizer 30 is split into a cartridge containing the liquid reservoir 38 and a separate vaporizer portion containing the heater 36. In this configuration, the cartridge may be disposed of after the liquid in reservoir 38 has been exhausted, but the separate vaporizer portion containing the heater 36 is retained. Alternatively, an e-cigarette may be provided with a cartomizer 30 as shown in FIG. 1, or else constructed as a one-piece (unitary) device, but the liquid reservoir 38 is in the form of a (user-)replaceable cartridge. Further possible variations are that the heater 36 may be located at the opposite end of the cartomizer 30 from that shown in FIG. 1, i.e. between the liquid reservoir 38 and the mouthpiece 35, or else the heater 36 is located along a central axis LA of the cartomizer 30, and the liquid reservoir 38 is in the form of an annular structure which is radially outside the heater 35.

The skilled person will also be aware of a number of possible variations for the control unit 20. For example, airflow may enter the control unit 20 at the tip end, i.e. the opposite end to connector 21A, in addition to or instead of the airflow adjacent to PCB 28. In this case the airflow would typically be drawn towards the cartomizer 30 along a passage between the battery 54 and the outer wall of the control unit 20. Similarly, the control unit may comprise a PCB located on or near the tip end, e.g. between the battery and the tip end. Such a PCB may be provided in addition to or instead of PCB 28.

Furthermore, an e-cigarette 10 may support charging at the tip end, or via a socket elsewhere on the device, in addition to or in place of charging at the connection point between the cartomizer 30 and the control unit 20. (It will be appreciated that some e-cigarettes are provided as essentially integrated units, in which case a user is unable to disconnect the cartomizer from the control unit.) Other e-cigarettes may also support wireless (induction) charging, in addition to (or instead of) wired charging.

The above discussion of potential variations to the e-cigarette shown in FIG. 1 is by way of example. The skilled person will aware of further potential variations (and combination of variations) for the e-cigarette 10.

Figure 2:
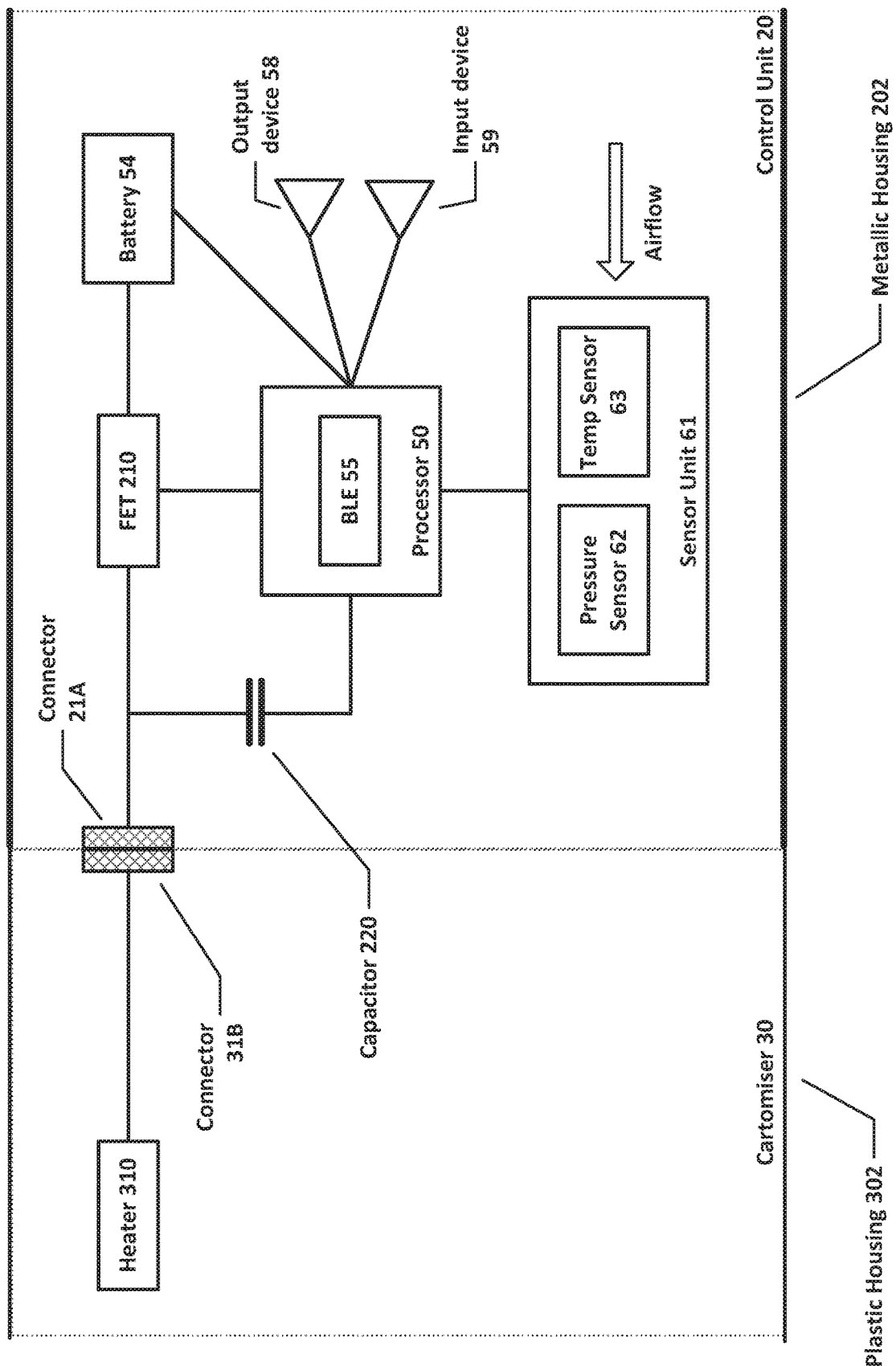
FIG. 2 is a schematic diagram of the main electrical/electronic components of the e-cigarette of FIG. 1 in accordance with some embodiments of the disclosure.

FIG. 2 is a schematic diagram of the main functional components of the e-cigarette 10 of FIG. 1 in accordance with some embodiments of the disclosure. N.B. FIG. 2 is primarily concerned with electrical connectivity and functionality—it is not intended to indicate the physical sizing of the different components, nor details of their physical placement within the control unit 20 or cartomizer 30. In addition, it will be appreciated that at least some of the components shown in FIG. 2 located within the control unit 20 may be mounted on the circuit board 28. Alternatively, one or more of such components may instead be accommodated in the control unit 20 to operate in conjunction with the circuit board 28, but not physically mounted on the circuit board 28 itself. For example, these components may be located on one or more additional circuit boards, or they may be separately located (such as battery 54).

As shown in FIG. 2, the cartomizer 30 contains heater 310 which receives power through connector 31B. The control unit 20 includes an electrical socket or connector 21A for connecting to the corresponding connector 31B of the cartomizer 30 (or potentially to a USB charging device). This then provides electrical connectivity between the control unit 20 and the cartomizer 30.

The control unit 20 further includes a sensor unit 61, which is located in or adjacent to the air path through the control unit 20 from the air inlet(s) to the air outlet (to the cartomizer 30 through the connector 21A). The sensor unit 61 contains a pressure sensor 62 and temperature sensor 63 (also in or adjacent to this air path). The control unit 20 further includes a capacitor 220, a processor 50, a field effect transistor (FET) switch 210, a battery 54, and input and output devices 59, 58.

The operations of the processor 50 and other electronic components, such as the pressure sensor 62, are generally controlled at least in part by software programs running on the processor 50 (or other components). Such software programs may be stored in non-volatile memory, such as ROM, which can be integrated into the processor 50 itself, or provided as a separate component. The processor 50 may access the ROM to load and execute individual software programs as and when required. The processor 50 also contains appropriate communications facilities, e.g. pins or pads (plus corresponding control software), for communicating as appropriate with other devices in the control unit 20, such as the pressure sensor 62.

The output device(s) 58 may provide visible, audio and/or haptic output. For example, the output device(s) 58 may include a speaker 58, a vibrator, and/or one or more lights. The lights are typically provided in the form of one or more light emitting diodes (LEDs), which may be the same or different colors (or multi-colored). In the case of multi-colored LEDs, different colors are obtained by switching different colored, e.g. red, green or blue, LEDs on, optionally at different relative brightnesses to give corresponding relative variations in color. Where red, green and blue LEDs are provided together, a full range of colors is possible, whilst if only two out of the three red, green and blue LEDs are provided, only a respective sub-range of colors can be obtained.

The output from the output device may be used to signal to the user various conditions or states within the e-cigarette 10, such as a low battery warning. Different output signals may be used for signaling different states or conditions. For example, if the output device 58 is an audio speaker, different states or conditions may be represented by tones or beeps of different pitch and/or duration, and/or by providing multiple such beeps or tones. Alternatively, if the output device 58 includes one or more lights, different states or conditions may be represented by using different colors, pulses of light or continuous illumination, different pulse durations, and so on. For example, one indicator light might be utilized to show a low battery warning, while another indicator light might be used to indicate that the liquid reservoir 58 is nearly depleted. It will be appreciated that a given e-cigarette 10 may include output devices to support multiple different output modes (audio, visual) etc.

The input device(s) 59 may be provided in various forms. For example, an input device (or devices) 59 may be implemented as buttons on the outside of the e-cigarette 10—e.g. as mechanical, electrical or capacitive (touch) sensors. Some devices may support blowing into the e-cigarette 10 as an input mechanism (such blowing may be detected by pressure sensor 62, which would then be also acting as a form of input device 59), and/or connecting/disconnecting the cartomizer 30 and control unit 20 as another form of input mechanism. Again, it will be appreciated that a given e-cigarette 10 may include input devices 59 to support multiple different input modes.

As noted above, the e-cigarette 10 provides an air path from the air inlet through the e-cigarette 10, past the pressure sensor 62 and the heater 310 in the cartomizer 30 to the mouthpiece 35. Thus when a user inhales on the mouthpiece 35 of the e-cigarette 10, the processor 50 detects such inhalation based on information from the pressure sensor 62. In response to such a detection, the CPU supplies power from the battery 54 to the heater 310, which thereby heats and vaporizes the nicotine from the liquid reservoir 38 for inhalation by the user.

In the particular implementation shown in FIG. 2, a FET 210 is connected between the battery 54 and the connector 21A. This FET 210 acts as a switch. The processor 50 is connected to the gate of the FET 210 to operate the switch, thereby allowing the processor 50 to switch on and off the flow of power from the battery 54 to heater 310 according to the status of the detected airflow. It will be appreciated that the heater current can be relatively large, for example, in the range 1-5 amps, and hence the FET 210 should be implemented to support such current control (likewise for any other form of switch that might be used in place of FET 210).

In order to provide more fine-grained control of the amount of power flowing from the battery 54 to the heater 310, a pulse-width modulation (PWM) scheme may be adopted. A PWM scheme may be based on a repetition period of say 1 ms. Within each such period, the switch 210 is turned on for a proportion of the period, and turned off for the remaining proportion of the period. This is parameterized by a duty cycle, whereby a duty cycle of 0 indicates that the switch is off for all of each period (i.e. in effect, permanently off), a duty cycle of 0.33 indicates that the switch is on for a third of each period, a duty cycle of 0.66 indicates that the switch is on for two-thirds of each period, and a duty cycle of 1 indicates that the FET 210 is on for all of each period (i.e. in effect, permanently on). It will be appreciated that these are only given as example settings for the duty cycle, and intermediate values can be used as appropriate.

The use of PWM provides an effective power to the heater which is given by the nominal available power (based on the battery output voltage and the heater resistance) multiplied by the duty cycle. The processor 50 may, for example, utilize a duty cycle of 1 (i.e. full power) at the start of an inhalation to initially raise the heater 310 to its desired operating temperature as quickly as possible. Once this desired operating temperature has been achieved, the processor 50 may then reduce the duty cycle to some suitable value in order to supply the heater 310 with the desired operating power.

As shown in FIG. 2, the processor 50 includes a communications interface 55 for wireless communications, in particular, support for Bluetooth® Low Energy (BLE) communications.

Optionally the heater 310 may be utilized as an antenna for use by the communications interface 55 for transmitting and receiving the wireless communications. One motivation for this is that the control unit 20 may have a metal housing 202, whereas the cartomizer portion 30 may have a plastic housing 302 (reflecting the fact that the cartomizer 30 is disposable, whereas the control unit 20 is retained and therefore may benefit from being more durable). The metal housing 202 acts as a screen or barrier which can affect the operation of an antenna located within the control unit 20 itself. However, utilizing the heater 310 as the antenna for the wireless communications can help to avoid this metal screening because of the plastic housing 320 of the cartomizer 30, but without adding additional components or complexity (or cost) to the cartomizer 30. Alternatively a separate antenna may be provided (not shown), or a portion of the metal housing 202 may be used.

If the heater 310 is used as an antenna then as shown in FIG. 2, the processor 50, more particularly the communications interface 55, may be coupled to the power line from the battery 54 to the heater 310 (via connector 31B) by a capacitor 220. This capacitive coupling occurs downstream of the switch 210, since the wireless communications may operate when the heater 310 is not powered for heating (as discussed in more detail below). It will be appreciated that capacitor 220 helps prevent the power supply from the battery 54 to the heater 310 being diverted back to the processor 50.

Note that the capacitive coupling may be implemented using a more complex LC (inductor-capacitor) network, which can also provide impedance matching with the output of the communications interface 55. (As known to the person skilled in the art, this impedance matching can help support proper transfer of signals between the communications interface 55 and the heater 310 acting as the antenna, rather than having such signals reflected back along the connection.)

In some implementations, the processor 50 and communications interface are implemented using a Dialog DA14580 chip from Dialog Semiconductor PLC, based in Reading, United Kingdom. Further information (and a data sheet) for this chip is available at www.dialot-semiconductor.com.

Figure 3:
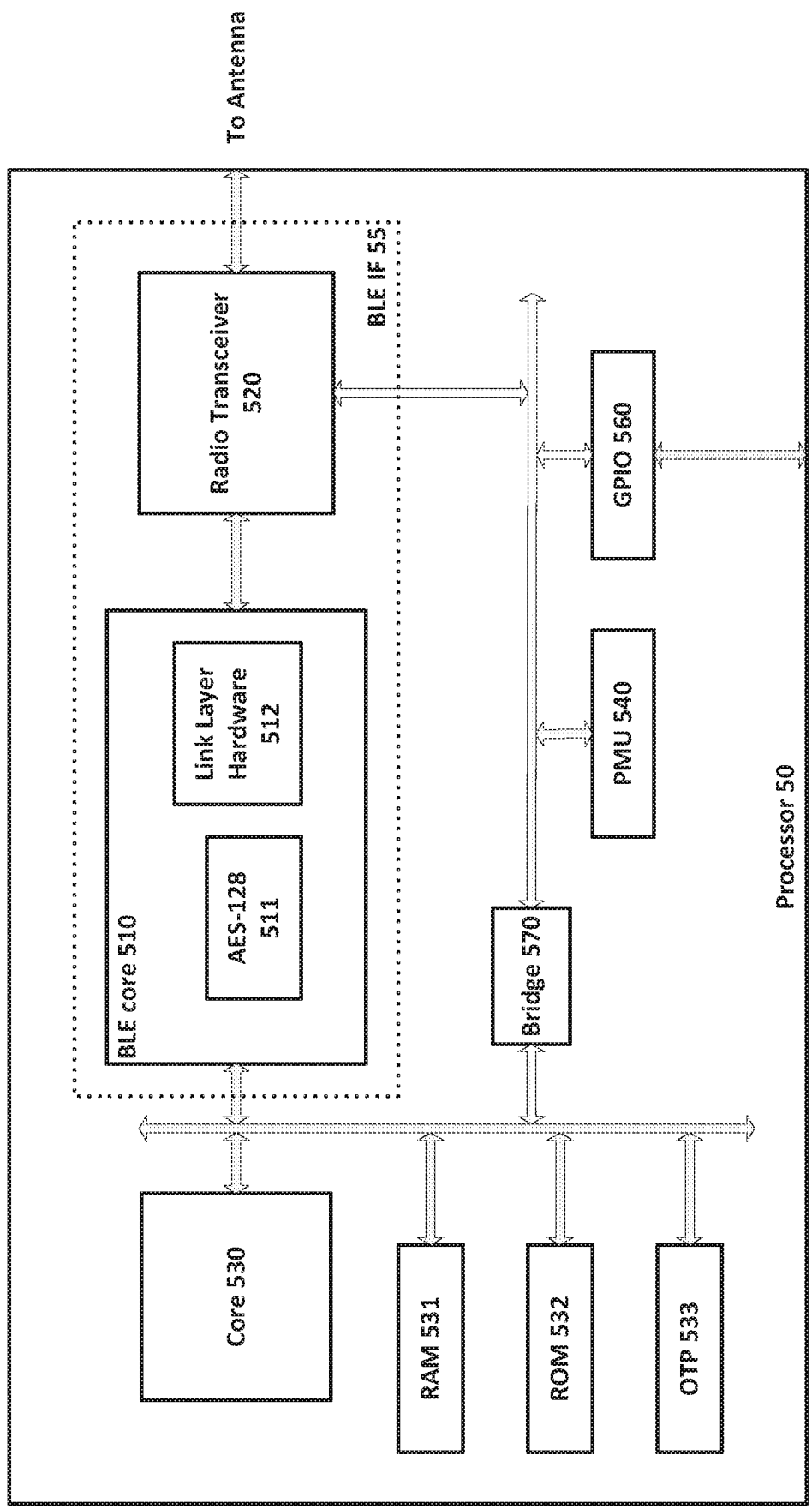
FIG. 3 is a simplified schematic diagram of the processor of the e-cigarette of FIG. 1 in accordance with some embodiments of the disclosure.

FIG. 3 presents a high-level and simplified overview of this chip 50, including the communications interface 55 for supporting Bluetooth® Low Energy. This interface 55 includes in particular a radio transceiver 520 for performing signal modulation and demodulation, etc., link layer hardware 512, and an advanced encryption facility (128 bits) 511. The output from the radio transceiver 520 is connected to the antenna (for example, to the heater 310 acting as the antenna via capacitive coupling 220 and connectors 21A and 31B).

The remainder of processor 50 includes a general processing core 530, RAM 531, ROM 532, a one-time programming (OTP) unit 533, a general purpose I/O system 560 (for communicating with other components on the PCB 28), a power management unit 540 and a bridge 570 for connecting two buses. Software instructions stored in the ROM 532 and/or OTP unit 533 may be loaded into RAM 531 (and/or into memory provided as part of core 530) for execution by one or more processing units within core 530. These software instructions cause the processor 50 to implement various functionality described herein, such as interfacing with the sensor unit 61 and controlling the heater accordingly. Note that although the device shown in FIG. 3 acts as both a communications interface 55 and also as a general controller for the electronic vapor provision system 10, in other embodiments these two functions may be split between two or more different devices (chips)—e.g. one chip may serve as the communications interface 55, and another chip as the general controller for the electronic vapor provision system 10.

In some implementations, the processor 50 may be configured to prevent wireless communications when the heater 310 is being used for vaporizing liquid from reservoir 38. For example, wireless communications may be suspended, terminated or prevented from starting when switch 210 is switched on. Conversely, if wireless communications are ongoing, then activation of the heater 310 may be prevented—e.g. by disregarding a detection of airflow from the sensor unit 61, and/or by not operating switch 210 to turn on power to the heater 310 while the wireless communications are progressing.

Figure 4:
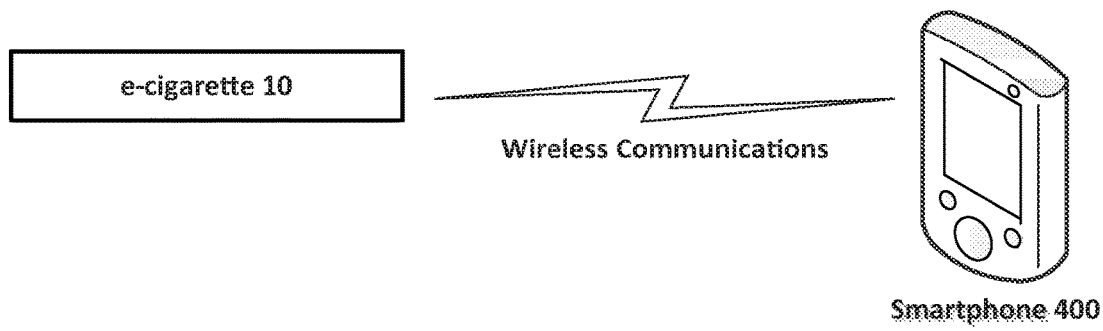
FIG. 4 is a schematic diagram of wireless communications between the e-cigarette of FIG. 1 and a mobile communication device.

One reason for preventing the simultaneous operation of heater 310 for both heating and wireless communications in some implementations is to help avoid potential interference from the PWM control of the heater 310. This PWM control has its own frequency (based on the repetition frequency of the pulses), albeit typically much lower than the frequency used for the wireless communications, and the two could potentially interfere with one another. In some situations, such interference may not, in practice, cause any problems, and simultaneous operation of heater 310 for both heating and wireless communications may be allowed (if so desired). This may be facilitated, for example, by techniques such as the appropriate selection of signal strengths and/or PWM frequency, the provision of suitable filtering, etc. FIG. 4 is a schematic diagram showing Bluetooth® Low Energy communications between an e-cigarette 10 and an application (app) running on a smartphone 400 or other suitable mobile communication device (tablet, laptop, smartwatch, etc). Such communications can be used for a wide range of purposes, for example, to upgrade firmware on the e-cigarette 10, to retrieve usage and/or diagnostic data from the e-cigarette 10, to reset or unlock the e-cigarette 10, to control settings on the e-cigarette, etc.

In general terms, when the e-cigarette 10 is switched on, such as by using input device 59, or possibly by joining the cartomizer 30 to the control unit 20, it starts to advertise for Bluetooth® Low Energy communication. If this outgoing communication is received by smartphone 400, then the smartphone 400 requests a connection to the e-cigarette 10. The e-cigarette 10 may notify this request to a user via output device 58, and wait for the user to accept or reject the request via input device 59. Assuming the request is accepted, the e-cigarette 10 is able to communicate further with the smartphone 400. Note that the e-cigarette 10 may remember the identity of smartphone 400 and be able to accept future connection requests automatically from that smartphone 400. Once the connection has been established, the smartphone 400 and the e-cigarette 10 operate in a client-server mode, with the smartphone 400 operating as a client that initiates and sends requests to the e-cigarette 10 which therefore operates as a server (and responds to the requests as appropriate).

A Bluetooth® Low Energy link (also known as Bluetooth Smart®) implements the IEEE 802.15.1 standard, and operates at a frequency of 2.4-2.5 GHz, corresponding to a wavelength of about 12 cm, with data rates of up to 1 Mbit/s. The set-up time for a connection is less than 6 ms, and the average power consumption can be very low—of the order 1 mW or less. A Bluetooth® Low Energy link may extend up to some 50 m. However, for the situation shown in FIG. 4, the e-cigarette 10 and the smartphone 400 will typically belong to the same person, and will therefore be in much closer proximity to one another—e.g. 1 m. Further information about Bluetooth® Low Energy can be found at www.bluetooth.com.

It will be appreciated that e-cigarette 10 may support other communications protocols for communication with smartphone 400 (or any other appropriate device). Such other communications protocols may be instead of, or in addition to, Bluetooth® Low Energy. Examples of such other communications protocols include Bluetooth® (not the low energy variant), see for example, www.bluetooth.com, near field communications (NFC), as per ISO 13157, and WiFi®. NFC communications operate at much lower wavelengths than Bluetooth® (13.56 MHz) and generally have a much shorter range—say <0.2 m. However, this short range is still compatible with most usage scenarios such as shown in FIG. 4. Meanwhile, low-power WiFi® communications, such as IEEE802.11ah, IEEE802.11v, or similar, may be employed between the e-cigarette 10 and a remote device. In each case, a suitable communications chipset may be included on PCB 28, either as part of the processor 50 or as a separate component. The skilled person will be aware of other wireless communication protocols that may be employed in e-cigarette 10.

Figure 5:
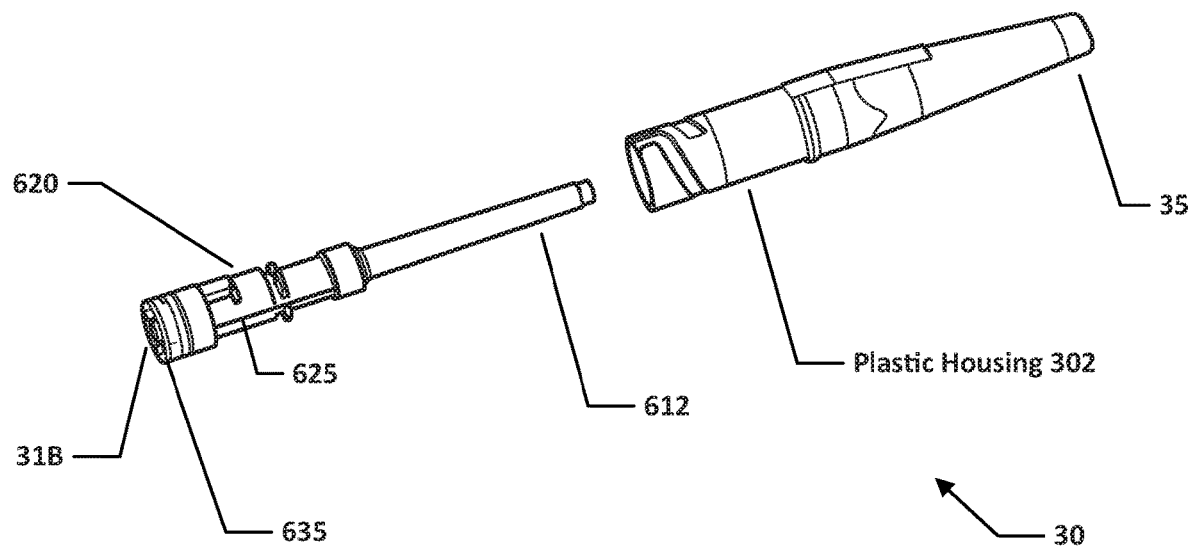
FIG. 5 is a schematic (exploded) diagram of the cartomizer of an e-cigarette in accordance with some embodiments of the disclosure.

FIG. 5 is a schematic, exploded view of an example cartomizer 30 in accordance with some embodiments. The cartomizer 30 has an outer plastic housing 302, a mouthpiece 35 (which may be formed as part of the housing), a vaporizer 620, a hollow inner tube 612, and a connector 31B for attaching to a control unit 20. An airflow path through the cartomizer 30 starts with an air inlet through connector 31B, then through the interior of vaporizer 620 and hollow tube 612, and finally out through the mouthpiece 35. The cartomizer 30 retains liquid in an annular region between (i) the plastic housing 302, and (ii) the vaporizer 620 and the inner tube 612. The connector 31B is provided with a seal 635 to help maintain liquid in this region and to prevent leakage.

Figure 6:
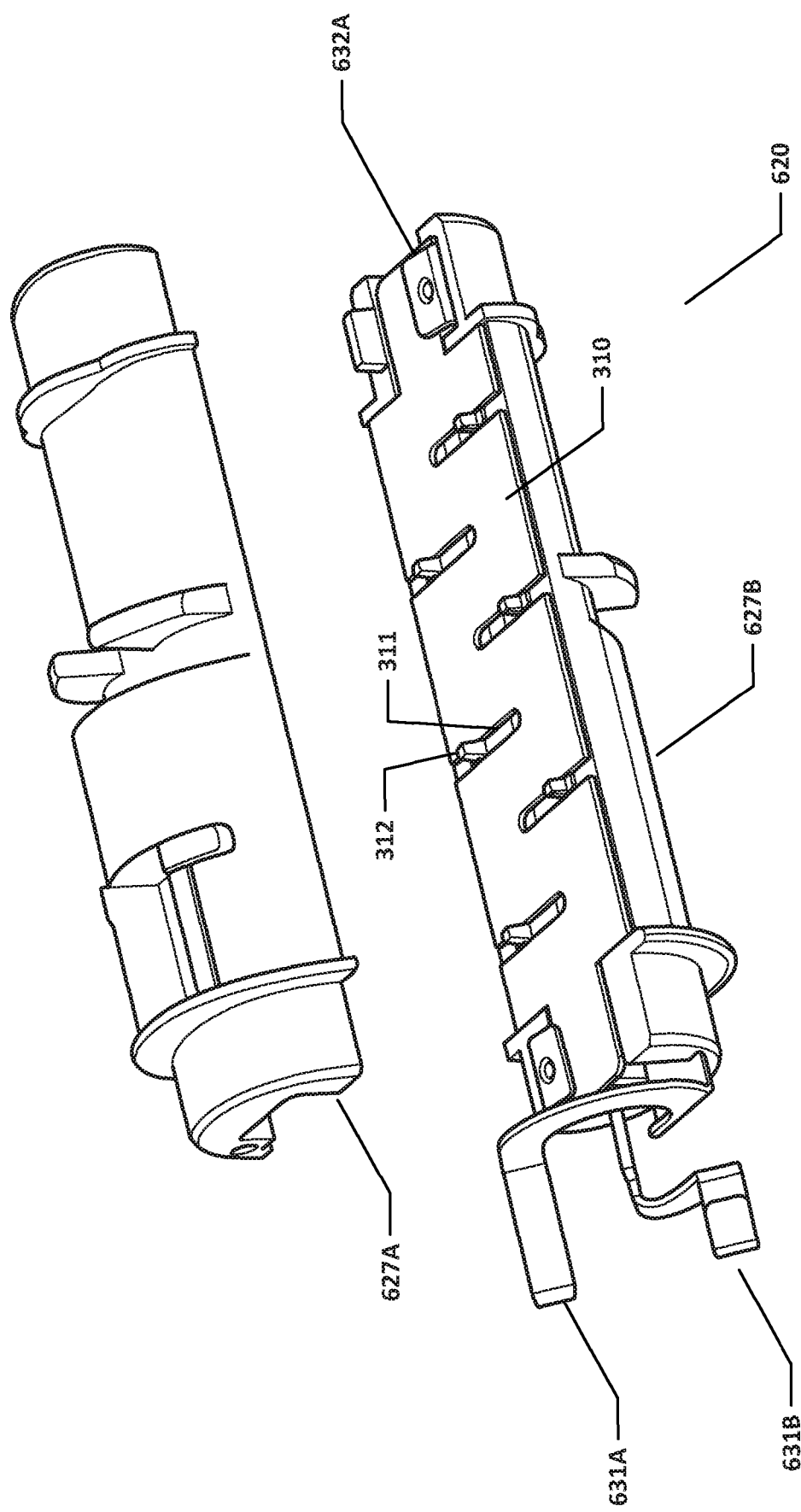
FIG. 6 is a schematic (exploded) diagram of the vaporizer from the cartomizer of FIG. 5 in accordance with some embodiments of the disclosure.

FIG. 6 is a schematic, exploded view of the vaporizer 620 from the example cartomizer 30 shown in FIG. 5. The vaporizer 620 has a substantially cylindrical housing (cradle) formed from two components, 627A, 627B, each having a substantially semi-circular cross-section. When assembled, the edges of the components 627A, 627B do not completely abut one another (at least, not along their entire length), but rather a slight gap 625 remains (as indicated in FIG. 5). This gap allows liquid from the outer reservoir around the vaporizer 620 and tube 612 to enter into the interior of the vaporizer 620.

One of the components 627B of the vaporizer 620 is shown in FIG. 6 supporting a heater 310. There are two connectors 631A, 631B shown for supplying power (and a wireless communication signal) to the heater 310. More particular, these connectors 631A, 631B link the heater 310 to connector 31B, and from there to the control unit 20. (Note that connector 631A is joined to pad 632A at the far end of vaporizer 620 from connector 31B by an electrical connection that passes under the heater 310 and which is not visible in FIG. 6.)

The heater 310 comprises a heating element formed from a sintered metal fiber material and is generally in the form of a sheet or porous, conducting material (such as steel). However, it will be appreciated that other porous conducting materials may be used. The overall resistance of the heating element in the example of FIG. 6 is around 1 ohm. However, it will be appreciated that other resistances may be selected, for example having regard to the available battery voltage and the desired temperature/power dissipation characteristics of the heating element. In this regard, the relevant characteristics may be selected in accordance with the desired aerosol (vapor) generation properties for the device depending on the source liquid of interest.

The main portion of the heating element is generally rectangular with a length (i.e. in a direction running between the connector 31B and the contact 632A) of around 20 mm and a width of around 8 mm. The thickness of the sheet comprising the heating element in this example is around 0.15 mm.

As can be seen in FIG. 6, the generally-rectangular main portion of the heating element has slots 311 extending inwardly from each of the longer sides. These slots 311 engage pegs 312 provided by vaporizer housing component 627B, thereby helping to maintain the position of the heating element in relation to the housing components 627A, 627B.

The slots 311 extend inwardly by around 4.8 mm and have a width of around 0.6 mm. The slots 311 extending inwardly are separated from one another by around 5.4 mm on each side of the heating element, with the slots extending inwardly from the opposing sides being offset from one another by around half this spacing. A consequence of this arrangement of slots 311 is that current flow along the heating element is in effect forced to follow a meandering path, which results in a concentration of current and electrical power around the ends of the slots 311. The different current/power densities at different locations on the heating element mean there are areas of relatively high current density that become hotter than areas of relatively low current density. This in effect provides the heating element with a range of different temperatures and temperature gradients, which can be desirable in the context of aerosol provision systems. This is because different components of a source liquid may aerosolize/vaporize at different temperatures, and so providing a heating element with a range of temperatures can help simultaneously aerosolize a range of different components in the source liquid.

The heater 310 shown in FIG. 6, having a substantially planar shape which is elongated in one direction, is well-suited to act as an antenna. In conjunction with the metal housing 202 of the control unit 20, the heater 310 forms an approximate dipole configuration, which typically has a physical size of the same order of magnitude as the wavelength of Bluetooth® Low Energy communications—i.e. a size of several centimeters (allowing for both the heater 310 and the metal housing 202) against a wavelength of around 12 cm.

Although FIG. 6 illustrates one shape and configuration of the heater 310 (heating element), the skilled person will be aware of various other possibilities. For example, the heater 310 may be provided as a coil or some other configuration of resistive wire. Another possibility is that the heater 310 is configured as a pipe containing liquid to be vaporized (such as some form of tobacco product). In this case, the pipe may be used primarily to transport heat from a place of generation (e.g. by a coil or other heating element) to the liquid to be vaporized. In such a case, the pipe still acts as a heater 310 in respect of the liquid to be heated. Such configurations can again optionally be used as an antenna to support wireless configurations.

As was noted previously herein, a suitable e-cigarette 10 can communicate with a mobile communication device 400, for example by pairing the devices using the Bluetooth® low energy protocol.

Consequently, it is possible to provide additional functionality to the e-cigarette 10 and/or to a system comprising the e-cigarette 10 and the smartphone, by providing suitable software instructions (for example in the form of an app) to run on the smartphone.

Figure 7:
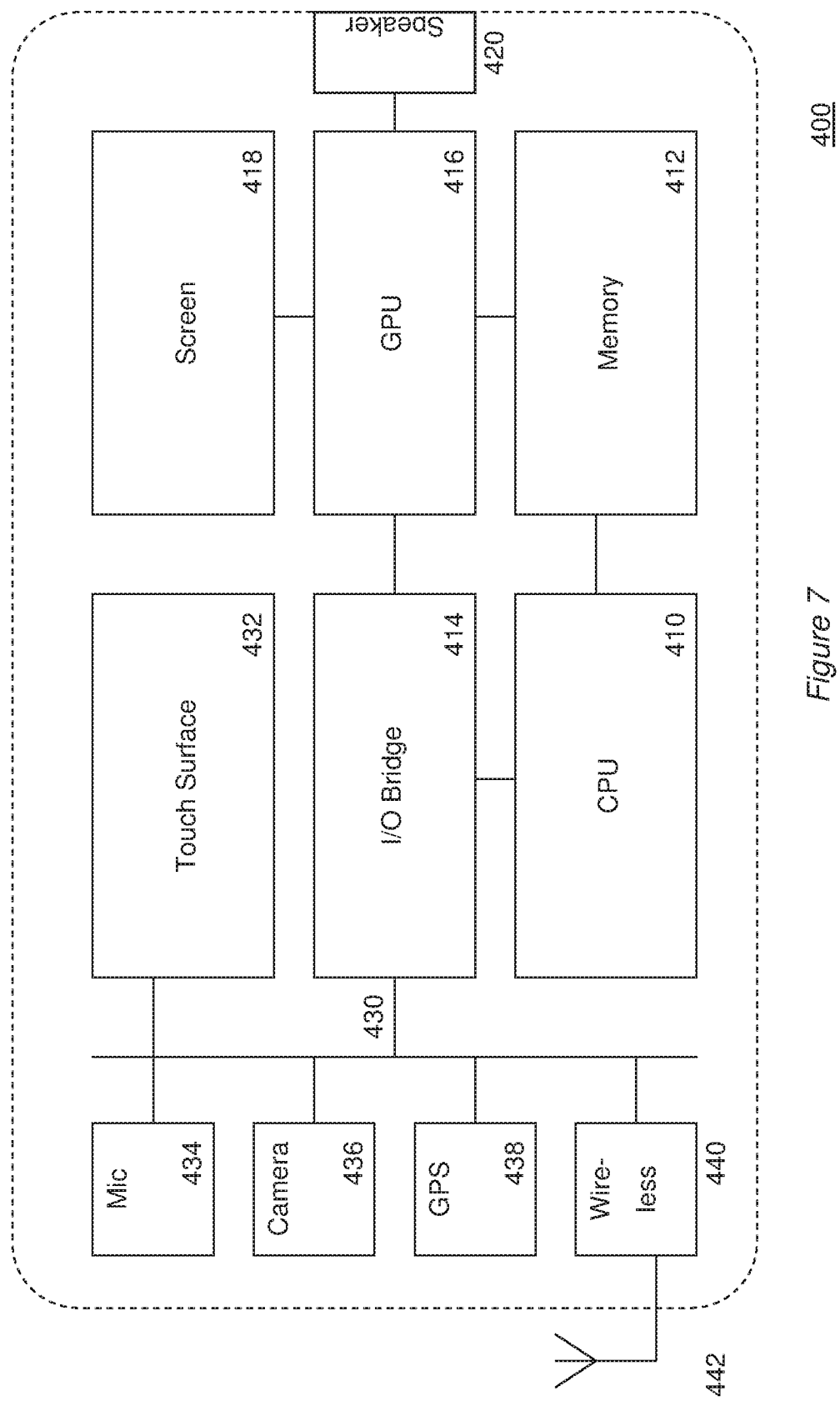
FIG. 7 is a schematic diagram of a mobile communication device in accordance with some embodiments of the disclosure.

Turning now to FIG. 7, a typical smartphone 400 comprises a central processing unit (CPU) (410). The CPU 410 may communicate with components of the smart phone 400 either through direct connections or via an I/O bridge 414 and/or a bus 430 as applicable.

In the example shown in FIG. 7, the CPU 410 communicates directly with a memory 412, which may comprise a persistent memory such as for example Flash® memory for storing an operating system and applications (apps), and volatile memory such as RAM for holding data currently in use by the CPU 410. Typically persistent and volatile memories are formed by physically distinct units (not shown). In addition, the memory 412 may separately comprise plug-in memory such as a microSD card, and also subscriber information data on a subscriber information module (SIM) (not shown).

The smartphone may also comprise a graphics processing unit (GPU) 416. The GPU 416 may communicate directly with the CPU 410 or via the I/O bridge, or may be part of the CPU 410. The GPU 416 may share RAM with the CPU 410 or may have its own dedicated RAM (not shown) and is connected to the display 418 of the smartphone 400. The display is typically a liquid crystal (LCD) or organic light-emitting diode (OLED) display, but may be any suitable display technology, such as e-ink. Optionally the GPU 416 may also be used to drive one or more loudspeakers 420 of the smartphone 400.

Alternatively, the speaker may be connected to the CPU 410 via the I/O bridge and the bus. Other components of the smartphone 400 may be similarly connected via the bus, including a touch surface 432 such as a capacitive touch surface overlaid on the screen for the purposes of providing a touch input to the device, a microphone 434 for receiving speech from the user, one or more cameras 436 for capturing images, a global positioning system (GPS) unit 438 for obtaining an estimate of the geographical position of the smartphone 400, and wireless communication means 440.

The wireless communication means 440 may in turn comprise several separate wireless communication systems adhering to different standards and/or protocols, such as Bluetooth® (standard or low-energy variants), near field communication and Wi-Fi® as described previously, and also phone based communication such as 2G, 3G and/or 4G.

The systems are typically powered by a battery (not shown) that may be chargeable via a power input (not shown) that in turn may be part of a data link such as USB (not shown).

It will be appreciated that different smartphones 400 may include different features (for example a compass or a buzzer) and may omit some of those listed above (for example a touch surface).

Thus more generally, in an embodiment of the present disclosure a suitable remote device such as smartphone 400 will comprise a CPU and a memory for storing and running an app, and wireless communication means operable to instigate and maintain wireless communication with the e-cigarette 10. It will be appreciated however that the remote device may be a device that has these capabilities, such as a tablet, laptop, smart TV or the like.

Figure 8:
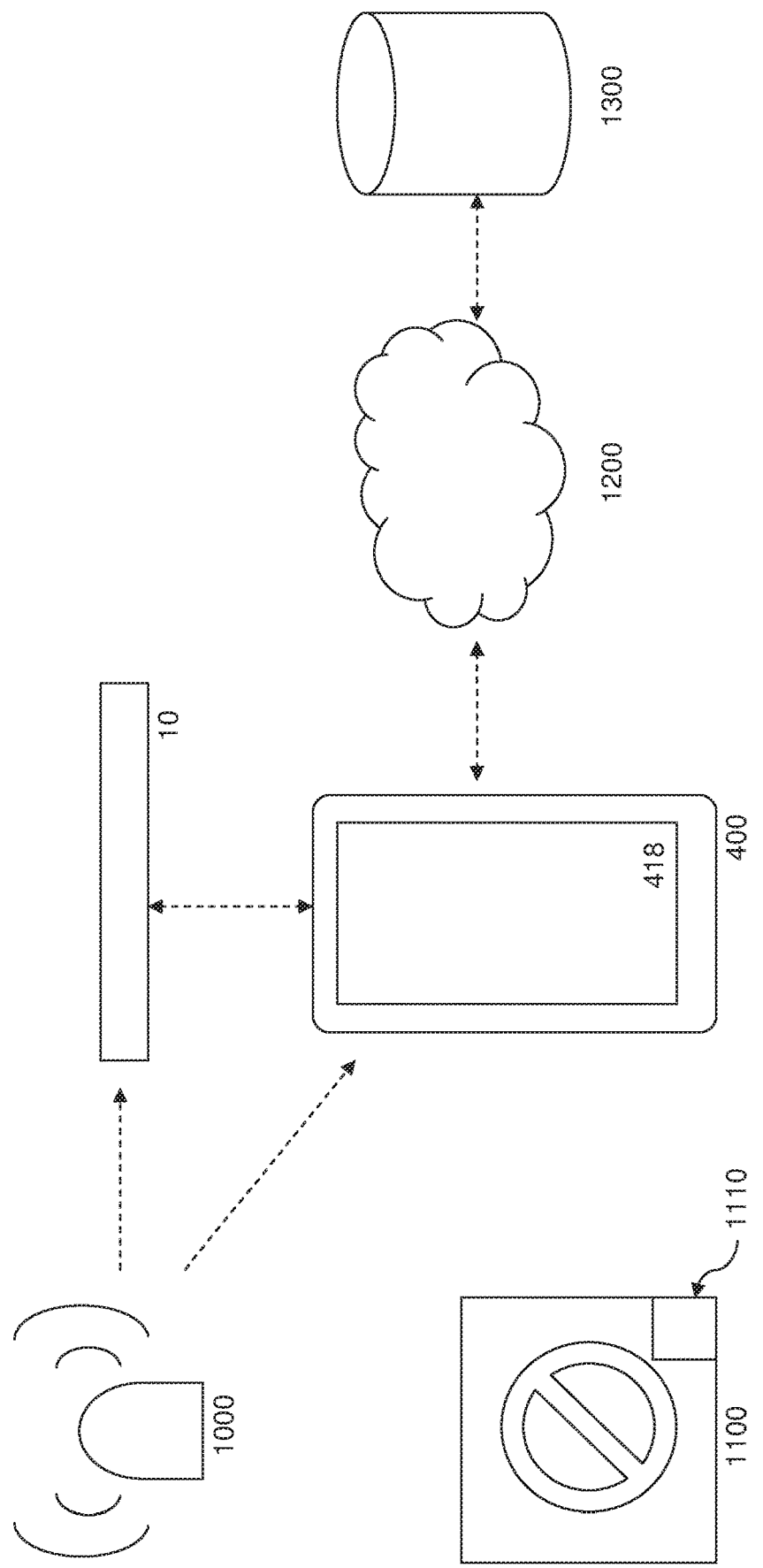
FIG. 8 is a schematic diagram of a policy notification system for electronic vapor provision systems in accordance with some embodiments of the disclosure.

Referring now to FIG. 8, in an embodiment of the present disclosure, a first system comprises an electronic cigarette 10 and a wireless beacon 1000.

In this first system, the wireless beacon 1000 operates as a wireless vaping policy beacon. The beacon 1000 may be used by a proprietor of an establishment, for example a restaurant, to indicate that a specific vaping policy is requested within the establishment, as explained later herein.

Figure 9:
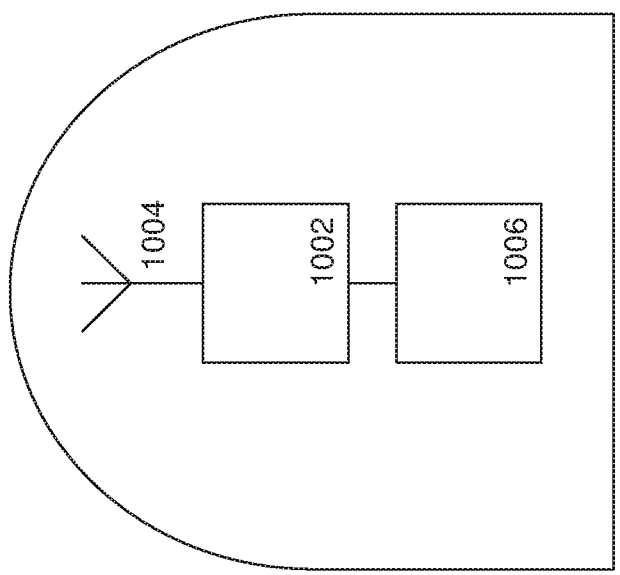
FIG. 9 is a schematic diagram of a wireless vaping policy beacon in accordance with some embodiments of the disclosure.

Referring now also to FIG. 9, the wireless vaping policy beacon 1000 comprises a wireless transmitter 1002 (typically connected to a suitable aerial 1004) adapted to transmit a beacon signal comprising a unique identifier (typically stored in a memory 1006). Notably the beacon signal also comprises a common identifier indicating that the beacon is used for the transmission of vaping policies.

The common identifier may be separate to the unique identifier or may be part of it (i.e. a subsequence thereof). The common identifier is a sequence of one or more values that is agreed by convention, for example it may be defined in accordance with an operating standard established for systems supporting operations in accordance with the principles described herein, to indicate that a beacon comprising this sequence is being used for the purpose of transmitting a vaping policy, and can thus be treated as such by an e-cigarette 10.

Consequently, the beacons 1000 used for transmission of vaping policies may be conventional wireless transmitter beacons, but by including the common identifier in the beacon signal it becomes a wireless vaping policy beacon.

As a specific example, the wireless transmitter 1002 of the beacon 1000 may be a Bluetooth® device, and the unique identifier may be a unique user identifier (UUID) transmitted by the Bluetooth device operating in advertisement mode. That is to say, the beacon 1000 may comprise a Bluetooth® device (Bluetooth® beacon). It will be appreciated that the term "Bluetooth® device" use herein may encompass any Bluetooth® standard including Bluetooth® low energy.

In advertisement mode, the Bluetooth® device acts as a beacon and typically transmits its MAC address and a payload in the form of a UUID.

The UUID is typically a unique hexadecimal sequence (although any data convention may be used) loaded into the memory of the beacon. However, in an embodiment of the present disclosure, part of this sequence is arranged to comprise the common identifier that indicates that the beacon is specifically a wireless vaping policy beacon.

Hence as a non-limiting example, a UUID for a beacon may be:

fb0b57a2-8228-44 cd-913a-94a122ba1201 wherein all wireless vaping policy beacons are arranged to comprise (as a non-limiting example) the common identifier sub-sequence:

ba120

It will be appreciated that the beacon is not limited to Bluetooth®, but may use any suitable wireless technology capable of broadcasting an identifier, such as Wi-Fi®. In this case, the service set identifier (SSID) is a broadcast identifier that can be user-modified to comprise additional character sequences such as the common identifier sub-sequence above.

Clearly however, the protocol used in the beacon 1000 should be compatible with the receiving capabilities of the electronic cigarette 10, or where there are several dominant receiving capabilities in the e-cigarette market, the beacon 1000 may employ multiple protocols to increase compatibility. Hence in the case where the e-cigarette 10 uses Bluetooth® low energy for communications, then the beacon 1000 will use a conforming standard.

In an embodiment of the present disclosure, the beacon signal also comprises a policy code that is a series of one or more values indicating one of a plurality of predefined policies. This policy code may typically also be a subsequence of the unique identifier. In the above non-limiting example, the final digit "1" immediately following the indicative sub sequence "ba120" may be this policy code, although it is not necessary for this digit or digits to be adjacent to the indicative sub sequence in this manner. Where the common identifier is a separate sequence to the unique identifier, typically the policy code will be associated with the common identifier.

The policy code may indicate one of a number of predetermined policies that the e-cigarette 10 can adopt.

The policies may include firstly, setting a warning light on the e-cigarette 10, in order to alert the user to the fact that the proprietor of the establishment housing the beacon 1000 requests that patrons moderate their use of e-cigarettes 10 within the establishment.

Secondly, reducing the level of heating provided by the e-cigarette 10, to reduce the amount of vapor generated whilst in the establishment.

Thirdly, restricting a heating operation of the electronic vapor provision system (e.g. stopping an on-going heater operation or preventing a new heater operation), thereby preventing vaping within the establishment.

Fourthly, restricting a heating operation of the electronic vapor provision system for a predetermined period of time.

In the fourth case, the period of time may be relative and may be a pre-set, such as for example the next half an hour, or may be specified by a separate value or values. Alternatively the period of time may be absolute, such as "before 9 PM" and again the absolute time may be pre-set or specified by a separate value or values. To implement this optional policy, the e-cigarette should optionally comprise a clock or timer.

The ability to prevent vaping, or indeed merely reduce vaping levels or warn against vaping for a period of time after detecting the unique identifier, may be of use in large establishments, where the beacon 1000 may be provided near an entrance of the establishment but the user may subsequently move out of range of the beacon 1000 but still be in the establishment. Examples of such establishments would be underground transit systems, sports stadiums, factories, department stores and the like. Similarly, an establishment may have different policies at different times, for example only requesting users refrain from vaping before a 9 pm watershed.

The beacon 1000 itself may be incorporated into a plug, thereby drawing power from a mains supply, or may be battery-powered, allowing for more flexibility of positioning. Using Bluetooth® low energy, a battery power beacon may typically last between 1 and 3 years. In an embodiment of the present disclosure, a battery-powered beacon 1000 is incorporated into a sign 1100 providing visible notice to a user of the default vaping policy of the establishment. Of course, such a sign 1100 may also be provided to accompany a mains powered beacon 1000.

Referring back to FIG. 2, in an embodiment of the present disclosure the e-cigarette 10 comprises a wireless receiver such as Bluetooth® low energy receiver 55 that receives the beacon signal from the wireless beacon 1000 comprising the unique identifier and the common identifier indicating that the beacon 1000 is used for the transmission of vaping policies. Processor 50 is then adapted (for example by suitable software instruction) to detect within the beacon signal the common identifier (for example by detecting the common identifier sub-sequence within the unique identifier such as "ba120" in the example given above). In response to detecting this common identifier, the processor 50 is also adapted to modify operation of the e-cigarette 10.

In a most basic system, the detection of the common identifier triggers a default modification to the operation of the e-cigarette 10, such as setting a warning light on the e-cigarette 10 to alert the user to the presence of a vaping policy beacon 1000. For example, by default an LED on the e-cigarette 10 may flash red. Alternatively, by default the e-cigarette 10 may prevent vaping by no longer energizing the heating element in response to inhalation by user. Optionally, the user may override the default response of the e-cigarette 10, for example by pressing a button on the e-cigarette 10 to resume normal functionality.

Alternatively or in addition, where the beacon signal also comprises a policy code, the e-cigarette processor 50 may be adapted to detect this and implement an indicated policy, such as one of those listed previously herein.

Referring again to FIG. 8, in an embodiment of the present disclosure, a second system comprises the electronic cigarette 10 the wireless beacon 1000 and a mobile communication device 400.

In a first scenario, the mobile communication device (e.g. a smartphone) simply acts as an intermediary, receiving the beacon signal from the wireless vaping policy beacon 1000 and forwarding it to the e-cigarette 10 via its own pre-established link. This may have the advantage of extending the battery life of the e-cigarette 10 and/or the effective range of the beacon, as the smartphone 400 may optionally detect Bluetooth® signals at a higher gain than the e-cigarette 10. The e-cigarette 10 may or may not independently detect beacons in parallel.

In a second scenario, the mobile communication device (e.g. under suitable software instruction from an app) implements much of the functionality of the e-cigarette 10 described previously in relation to detection of the beacon 1000 and parsing the signal, and consequently issues suitable commands to the e-cigarette 10 to implement a policy. Hence in this case the reception and parsing of the beacon signal and the selection of a policy are implemented by the mobile communication device 400 instead of the e-cigarette 10, and the appropriate policy commands are first issued by the processor of the mobile communication device 400 instead of that of the e-cigarette 10.

Hence referring back to FIG. 7, the mobile communication device 400 comprises a wireless receiver 440 adapted to receive a beacon signal from a wireless beacon 1000, the beacon signal comprising a unique identifier and a common identifier indicating that the beacon 1000 is used for the transmission of vaping policies, the mobile communication device 400 also comprises a processor (CPU 410) adapted (for example by suitable software instruction) to detect the common identifier within the beacon signal; and the processor is similarly adapted by software instruction to modify operation of the communication device 400 in response to such detection.

The modifications may include:
  i. displaying a warning message on a screen 418 of the mobile communication device 400;
  ii. causing the mobile communication device 400 to vibrate or emit a sound;

iii. transmitting, via an established link (e.g. a paired Bluetooth® low energy link) to the e-cigarette 10, a message confirming the authenticity of the wireless vaping policy beacon 1000;
iv. transmitting, via an established link to the e-cigarette 10, a command to set a warning indicator, such as a light, on the electronic vapor provision system;
v. transmitting, via an established link to the e-cigarette 10, a command to reduce the level of heating provided by the electronic vapor provision system;
vi. transmitting, via an established link to the e-cigarette 10, a command to restrict a heating operation of the electronic vapor provision system; and
vii. transmitting, via an established link to the e-cigarette 10, a command to restrict a heating operation of the electronic vapor provision system for a predetermined period of time.

The warning message in modification i. above may be a pre-set message selected in response to a policy code, for example either requesting that users refrain from vaping, or informing them that the establishment has a designated smoking/vaping area.

One or more of these modifications may form a default policy enacted by the mobile communications device 400, or may be selected in response to a policy code within the beacon signal as described above.

It will be appreciated that an e-cigarette 10 and a paired mobile communication device 400 may both receive the beacon signal from the beacon 1000. If an e-cigarette 10 implements a default policy in response to detecting the common identifier within the beacon signal, or is not capable of implementing a particular policy, then optionally the mobile communication device 400 may override the e-cigarette 10 in order to implement the specific indicated policy obtained from the beacon 1000 (for example, if an e-cigarette 10 does not comprise a clock or timer, then the mobile communication device 400 may send appropriate commands at appropriate times in response to a policy code specifying relative or absolute times). Meanwhile if the e-cigarette 10 is capable of parsing and implementing specific indicated policies obtained from the beacon 1000, then the mobile communication device 400 might not override the e-cigarette 10. The app on the mobile communication device 400 may determine the capabilities of the e-cigarette 10 during an initial registration process.

Hence by using the first and/or second system described herein above, the proprietor of an establishment may discreetly alert the users of e-cigarettes 10 to the preferred vaping policy of the establishment.

However, a supplementary issue may arise where unauthorized parties obtain a beacon signal from a wireless vaping policy beacon 1000, and retransmit it from another device at another location in order to send a vaping policy to e-cigarette users. For example, an unscrupulous third party may develop an app enabling anyone to use their smartphone to broadcast a "no vaping" policy beacon by replicating (spoofing) the obtained beacon signal.

In order to help mitigate this issue, then referring again to FIG. 8, in an embodiment of the present disclosure a third system comprises the electronic cigarette 10, the wireless beacon 1000, the mobile communication device 400 and a beacon authentication server 1300.

In this third system, the mobile communication device 400 (for example, under the instruction of an app) seeks to authenticate the wireless vaping policy beacon 1000 with the beacon authentication server 1300, by providing a separate authentication factor (authentication data) relating to the wireless vaping policy beacon 1000. As will be discussed in more detail below, the separate authentication factor may be GPS coordinates obtained whilst the beacon signal from the wireless beacon 1000 was received, a security certificate transmitted from the wireless beacon 1000 to the mobile communication device 400, or supplementary identification data extracted from a printed code such as a QR code on a visible sign posted in the establishment.

Consequently in this third system, the mobile communication device processor is adapted to obtain an authentication factor relating to the wireless vaping policy beacon 1000, and comprises a transmitter (e.g. WiFi® or mobile data over 3G, 4G etc.,) adapted to transmit the unique identifier and the authentication factor to a remote server. The mobile communication device's receiver then receives from the remote server indicator data indicating whether or not the wireless vaping policy beacon 1000 is authentic, before the processor modifies operation of the mobile communication device 400 in response to the indication data.

Hence this third system operates in a similar manner to the second system except that an app adapting the mobile communication device 400 waits for authentication of the beacon 1000 before implementing a policy on the e-cigarette 10 or issuing any warnings to the user.

Figure 10:
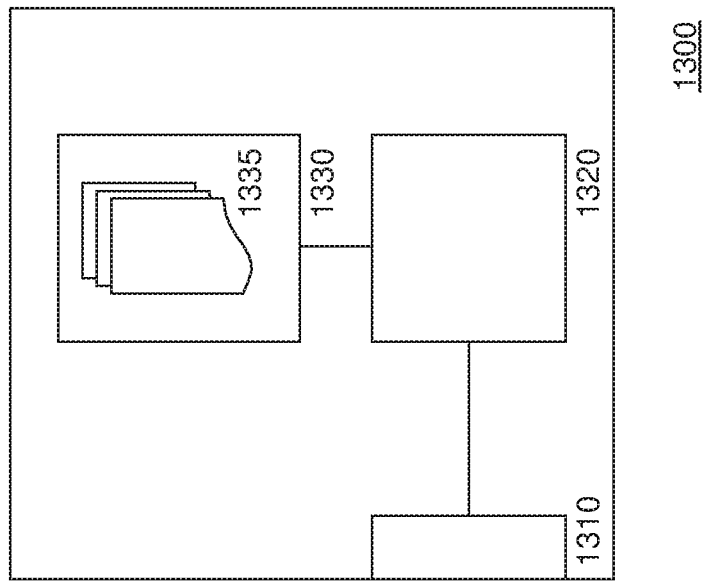
FIG. 10 is a schematic diagram of a beacon authentication server in accordance with some embodiments of the disclosure.

Turning now to FIG. 10, the beacon authentication server 1300 comprises a receiver 1310 (such as an Ethernet® port) adapted to receive, from a remote mobile communication device 400 (via a network such as the internet 1200), a unique identifier obtained from the beacon signal of a wireless vaping policy beacon 1000, and an authentication factor. The server 1300 also comprises a processor 1320, adapted for example by suitable software instructions, to evaluate the authentication factor based upon authentication data associated with the unique identifier in a database 1335 held in a memory 1330. The server 1300 may then transmit, for example via its Ethernet® port, to the remote mobile communication device 400, indicator data indicating whether or not the wireless vaping policy beacon 1000 is authentic, responsive to the evaluation of the authentication factor.

The indicator data may simply be a flag, and this may be part of a more extensive data exchange between the mobile communication device 400 and the server 1300.

Alternatively or in addition the indicator data may comprise vaping policy information, such as a message from the proprietor of the establishment that can be displayed on the mobile communication device display 418.

As noted above, the authentication factor may take one of several forms. In one instance, the authentication factor comprises GPS coordinates uploaded from the mobile communication device, in circumstances where the mobile communication device has a GPS capability and obtained GPS coordinates in response to detecting the common identifier in the beacon signal from the wireless vaping policy beacon. In this case, the beacon authentication server's processor is adapted to evaluate whether the uploaded GPS coordinates are within a threshold distance of a registered set of GPS coordinates associated with the unique identifier in the database 1335.

In this way, a proprietor of an establishment can register their wireless vaping policy beacon 1000 with the server 1300, and during registration they can provide a reference set of GPS coordinates corresponding to the location of their establishment and more specifically the location of the beacon 1000 whose unique identifier becomes associated with the reference GPS coordinates in the database 1335 of the server 1300. This process may be performed with a registration app run on a GPS-capable mobile communication device 400.

Subsequently, if a third party attempts to replicate the unique identifier of that beacon 1000 in a different location, the GPS coordinates uploaded by the smartphone 400 will differ from those registered in the database 1335 by an amount greater than a predetermined threshold (for example, a threshold radius/distance set during registration). As a result, the server will transmit indicator data indicating that the third party beacon is not authentic.

In a similar manner, in one instance the authentication factor is a trusted certificate transmitted by the beacon 1000 which has been issued and signed by a trusted authority using their private key. In this case, the beacon authentication server's processor is adapted to evaluate (verify) the certificate by using the public key of the relevant certificate authority to decrypt the certificate. The decrypted certificate may comprise confirmatory information such as the unique identifier of the wireless vaping policy beacon, and may also comprise an additional verification identifier held in association with the unique identifier in the database 1335 of the server 1300. If the certificate cannot be properly decrypted or the decrypted contents do not correspond to the unique identifier and/or verification identifier, then the server 1300 will transmit indicator data indicating that third-party party beacon is not authentic.

In this way, a proprietor of an establishment can register their wireless vaping policy beacon 1000 with the server 1300, and the server 1300 or an associated trusted certificate authority can issue a certificate to the beacon 1000 or unlock transmission of a preloaded certificate on the beacon 1000.

Again in a similar manner, in one instance the authentication factor is supplementary identification data extracted from a printed code such as a QR code on a visible sign 1100 posted in the establishment. As noted above, such a sign may actually incorporate the wireless vaping policy beacon 1000, or may be displayed in physical proximity to the beacon. This printed code (e.g. a barcode, alphanumeric code, QR code or similar) may be captured using a camera of the mobile communication device 400 and parsed to extract the supplementary identification data. Again the beacon authentication server 1300 may evaluate (compare) and confirm whether the beacon unique identifier and the supplementary identification data uploaded by the mobile communication device 400 correspond to the values stored in the database 1335. If they do not correspond, then the server 1300 will transmit indicator data indicating that third-party party beacon is not authentic.

In this way, a proprietor of an establishment can register their wireless vaping policy beacon 1000 with the server 1300 and upload the supplementary identification data extracted from the printed code on their associated notification sign. Subsequently third parties would need to provide a high fidelity copy of the sign and persuade users to take a picture of it in order to impose a vaping policy on those users. However, this approach does also require active participation by users to authenticate a legitimate wireless beacon 1000, by capturing and image of the printer code, and hence is more burdensome than the use of GPS coordinates or trusted certificates as mentioned above.

Finally, for any of the above authentication factors, the server 1300 may optionally be arranged to detect if a particular unique identifier is being validated more than an expected threshold number of times, which may indicate that the beacon signal has been cloned and that the owner of the beacon 1000 should be issued with a new unique identifier, with the current unique identifier being delisted. Of course, for some high-volume and sporadically used venues (such as sports stadia), this secondary check may be disabled.

Regardless of the authentication factor used, if the server 1300 transmits indicator data indicating a third party beacon is not authentic, then in response the mobile communication device 400 may ignore the beacon if it is acting to merely relay the beacon signal to the e-cigarette 10, or if it is parsing the beacon signal and implementing the policies on behalf of the e-cigarette 10. Alternatively or in addition it may send a policy override command to the e-cigarette 10 using its established link and optionally any prearranged authentication process between the e-cigarette 10 and the mobile communication device 400, so that the e-cigarette 10 no longer implements any policy in response to its own detection of the common identifier in the beacon signal.

In this way, a user's mobile phone 400 (e.g. operating under the instruction of an app) can prevent the unauthorized transmission of vaping policies to an e-cigarette 10 by third parties.

Alternatively, the mobile communications device 400 may not obtain an authentication factor and may not include such an authentication factor when transmitting the unique identifier to the server 1300. In this case, the server 1300 receives the unique identifier and returns indicator data indicative of the authenticity of the beacon signal for manual authentication by the user. Hence the indicator data may for example be the name of the establishment where the beacon 1000 is registered, which may be displayed by the app on the mobile communication device's screen 418. The user may then determine whether or the detected beacon 1000 is legitimate based on where they actually are. Optionally the user may then acknowledge or ignore the vaping policy, for example by tapping on an accept button or a deny button provided on screen 418 by the app. If the user accepts the policy then the mobile communication device 400 will either communicate it to the e-cigarette 10 or allow the e-cigarette 10 to continue implementing the policy as applicable, whereas if the user denies the policy then the mobile communication device 400 will either not communicated to the e-cigarette 10 or sending policy override command to the e-cigarette 10 to discontinue implementing the policy as applicable.

Figure 11:
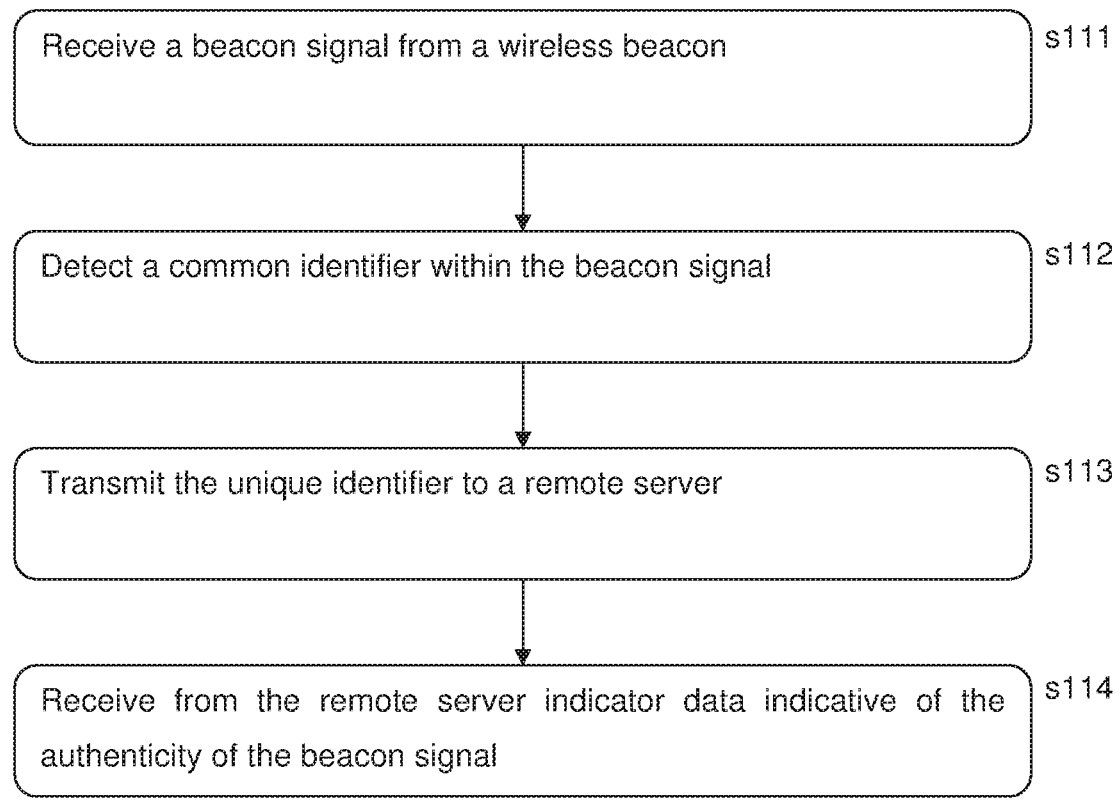
FIG. 11 is a flow diagram of a method of authenticating a wireless vaping policy beacon at a mobile communication device in accordance with some embodiments of the disclosure.

Turning now to FIG. 11, a method of authenticating a wireless vaping policy beacon at a mobile communication device comprises:

At s111, receiving a beacon signal from a wireless beacon, the beacon signal comprising a unique identifier and a common identifier indicating that the beacon is used for the transmission of vaping policies;

At s112, detecting the common identifier within the beacon signal;

At s113, extracting and transmitting the unique identifier to a remote server; and At s114, receiving from the remote server indicator data indicative of the authenticity of the beacon signal.

It will be apparent to a person skilled in the art that variations in the above method corresponding to operation of the various embodiments of the apparatus as described and claimed herein are considered within the scope of the present disclosure, including but not limited to:

Supplementary steps of
obtaining an authentication factor relating to the wireless beacon;
transmitting the authentication factor to the remote server; and modifying operation of the communication device in response to the indicator data;
and in which
the indicator data indicates whether or not the wireless vaping policy beacon is authentic;
modifying operation of the communication device by one or more selected from the list consisting of: displaying a warning message on a screen of the mobile communication device; and causing the mobile communication device to vibrate or emit a sound;
modifying operation of the communication device by transmitting, via an established link to an electronic vapor provision system, one or more selected from the list consisting of a message confirming the authenticity of the wireless vaping policy beacon; a command to set a warning light on the electronic vapor provision system; a command to reduce the level of heating provided by the electronic vapor provision system; a command to stop a heating operation of the electronic vapor provision system; and a command to stop a heating operation of the electronic vapor provision system for a predetermined period of time; and
selecting an authentication factor from one or more of: GPS coordinates obtained whilst the unique identifier from the wireless beacon can be received; a trusted certificate transmitted from the wireless beacon to the mobile communication device; and supplementary identification data extracted from a printed code.

Figure 12:
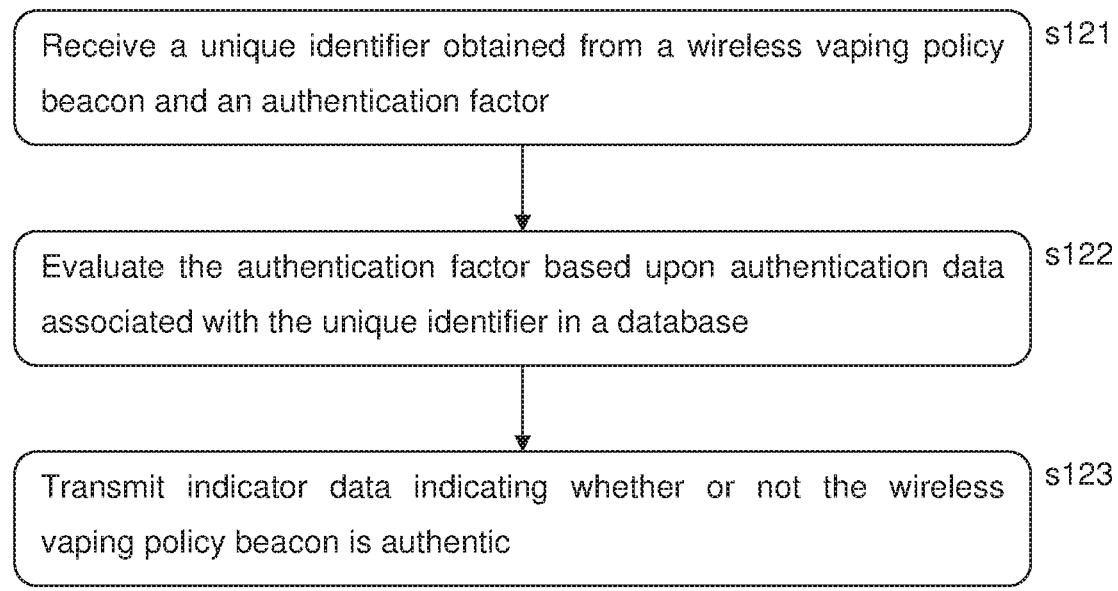
FIG. 12 is a flow diagram of a method of authenticating a wireless vaping policy beacon at a server in accordance with some embodiments of the disclosure.

Turning now to FIG. 12, a method of authenticating a wireless vaping policy beacon at a server, comprises:

At s121, receiving, from a remote mobile communication device, a unique identifier obtained from a wireless vaping policy beacon and an authentication factor;

At s122, evaluating the authentication factor based upon authentication data associated with the unique identifier in a database; and At s123, transmitting to the remote mobile communication device indicator data indicating whether or not the wireless vaping policy beacon is authentic, responsive to the evaluation of the authentication factor.

Again it will be apparent to a person skilled in the art that variations in the above method corresponding to operation of the various embodiments of the apparatus as described and claimed herein are considered within the scope of the present disclosure, including but not limited to:

If the authentication factor is a set of GPS coordinates, evaluating whether the GPS coordinates are within a threshold distance of a registered set of GPS coordinates associated with the unique identifier in the database; and If the authentication factor is a trusted certificate, evaluating the certificate by using the public key of the relevant certificate authority.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a tangible non-transitory machine-readable medium such as a floppy disk, optical disk, hard disk, PROM, RAM, flash memory or any combination of these or other storage media, or realized in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these of other networks.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc other than those specifically described herein. The disclosure may include other inventions not presently claimed, but which may be claimed in future.

Embodiments of the invention may comprise subject matter as disclosed in the following clauses:

Clause 1. An electronic vapor provision system, comprising:
a wireless receiver adapted to receive a beacon signal from a wireless beacon, the beacon signal comprising a common identifier indicating that the beacon is used for the transmission of vaping policies; and
a processor adapted to detect within the beacon signal the common identifier, wherein
the processor is adapted to modify operation of the electronic vapor provision system in response to detection of said common identifier.

Clause 2. The electronic vapor provision system of clause 1, in which
the beacon signal comprises a policy code indicative of one of a plurality of predefined policies; and
the processor is adapted to detect the policy code and modify operation of the electronic vapor provision system responsive to the detected policy code.

Clause 3. The electronic vapor provision system of clause 1 or clause 2, in which
the processor is adapted to modify operation of the electronic vapor provision system by activating a warning indication on the electronic vapor provision system.

Clause 4. The electronic vapor provision system of clause 3, wherein the warning indication comprises a light.

Clause 5. The electronic vapor provision system of clause 1 or clause 2, in which
the processor is adapted to modify operation of the electronic vapor provision system by modifying a level of heating that can be provided by the electronic vapor provision system.

Clause 6. The electronic vapor provision system of clause 1 or clause 2, in which
the processor is adapted to modify operation of the electronic vapor provision system by restricting a heating operation of the electronic vapor provision system.

Clause 7. The electronic vapor provision system of clause 1 or clause2, in which
the processor is adapted to modify operation of the electronic vapor provision system by restricting a heating operation of the electronic vapor provision system for a predetermined period of time.

Clause 8. The electronic vapor provision system of any one of the preceding clauses, comprising:
a wireless receiver adapted to receive a policy override command from a mobile communication device; and wherein
the processor is adapted to discontinue a policy modifying operation of the electronic vapor provision system upon receipt of the policy override command.

The invention claimed is:

1. A mobile communication device, comprising:
a wireless receiver adapted to receive a beacon signal from a wireless beacon, the beacon signal comprising a unique identifier and a common identifier indicating that the wireless beacon transmits vaping policies;
a processor adapted to detect within the beacon signal the common identifier and to obtain an authentication factor relating to the wireless beacon;
a transmitter adapted to transmit the unique identifier and the authentication factor to a remote server; and
a receiver adapted to receive from the remote server indicator data indicative of an authenticity of the beacon signal, wherein the indicator data indicates whether or not the wireless beacon is authentic and the processor is adapted to modify operation of the mobile communication device in response to the indicator data.

2. The mobile communication device of claim 1, wherein the authentication factor is one or more selected from the group consisting of:
i. GPS coordinates obtained while the unique identifier from the wireless beacon can be received by the mobile communication device;
ii. a certificate transmitted from the wireless beacon to the mobile communication device; and
iii. supplementary identification data extracted from a printed code.

3. A mobile communication device according to claim 1, wherein:
the indicator data comprises a registered location of the wireless beacon; and
the processor is adapted to display the registered location on a display of the mobile communication device.

4. The mobile communication device of claim 1, wherein:
the processor is adapted to modify operation of the mobile communication device by one or more selected from the group consisting of:
i. displaying a warning message on a screen of the mobile communication device;
ii. causing the mobile communication device to vibrate or emit a sound;
iii. transmitting, via an established link to an electronic vapor provision system, a message confirming the authenticity of the wireless beacon;
iv. transmitting, via an established link to an electronic vapor provision system, a command to set a warning indicator on the electronic vapor provision system;
v. transmitting, via an established link to an electronic vapor provision system, a command to modify a level of heating provided by the electronic vapor provision system;
vi. transmitting, via an established link to an electronic vapor provision system, a command to restrict a heating operation of the electronic vapor provision system; and
vii. transmitting, via an established link to an electronic vapor provision system, a command to restrict a heating operation of the electronic vapor provision system for a predetermined period of time.

5. A beacon authentication server, comprising:
a receiver adapted to receive, from a remote mobile communication device, a unique identifier from a wireless vaping policy beacon and an authentication factor;
a processor adapted to evaluate the authentication factor based upon authentication data associated with the unique identifier in a database of the server; and
a transmitter adapted to transmit, to the remote mobile communication device, indicator data indicating whether or not the wireless vaping policy beacon is authentic, responsive to the evaluation of the authentication factor.

6. The beacon authentication server of claim 5, wherein:
the authentication factor comprises GPS coordinates, and
the processor is adapted to evaluate whether the GPS coordinates are within a threshold distance of registered GPS coordinates associated with the unique identifier in the database.

7. The beacon authentication server of claim 5, wherein:
the authentication factor is a certificate, and
the processor is adapted to evaluate the certificate by using a public key of a relevant certificate authority to access the certificate.

8. A wireless vaping policy system, comprising:
the beacon authentication server of claim 5; and
a wireless vaping policy beacon, comprising:
a wireless transmitter adapted to transmit a beacon signal, wherein
the beacon signal comprises a unique identifier, and
the beacon signal comprises a common identifier indicating that the beacon transmits vaping policies.

9. The wireless vaping policy system of claim 8, wherein:
the beacon signal comprises a policy code indicating one of a plurality of predefined policies.

10. The wireless vaping policy system of claim 8, wherein the unique identifier is at least part of one selected from the group consisting of:
i. a unique user identifier transmitted by a Bluetooth® device operating in advertisement mode; and
ii. a Wi-Fi® service set identifier.

11. A method of authenticating a wireless vaping policy beacon at a mobile communication device, comprising:
receiving a beacon signal from a wireless beacon, the beacon signal comprising a unique identifier and a common identifier indicating that the wireless beacon transmits vaping policies;
detecting the common identifier within the beacon signal;
obtaining an authentication factor relating to the wireless beacon;
transmitting the unique identifier and the authentication factor to a remote server; and
receiving from the remote server indicator data indicative of the authenticity of the beacon signal, wherein the indicator data indicates whether or not the wireless beacon is authentic; and
modifying operation of the communication device in response to the indicator data.

12. A method of authenticating a wireless vaping policy beacon at a server, comprising:
receiving, from a remote mobile communication device, a unique identifier obtained from a wireless vaping policy beacon and an authentication factor;

evaluating the authentication factor based upon authentication data associated with the unique identifier in a database; and transmitting to the remote mobile communication device indicator data indicating whether or not the wireless vaping policy beacon is authentic, responsive to the evaluation of the authentication factor.

13. A non-transitory computer-readable storage medium storing a computer program product which, when executed by a computer, causes the computer to implement method of claim 11.

14. A non-transitory computer-readable storage medium storing a computer program product which, when executed by a computer, causes the computer to implement the method of claim 12.

15. A mobile communication device, comprising:
- a wireless receiver adapted to receive a beacon signal from a wireless beacon, the beacon signal comprising a unique identifier and a common identifier indicating that the wireless beacon transmits vaping policies;
- a processor adapted to detect within the beacon signal the common identifier;
- a transmitter adapted to transmit the unique identifier to a remote server; and
- a receiver adapted to receive from the remote server indicator data indicative of an authenticity of the beacon signal, wherein the indicator data comprises a registered location of the wireless beacon and the processor is adapted to display the registered location on a display of the mobile communication device.

* * * * *